(12) United States Patent
Rutherford et al.

(10) Patent No.: US 11,233,672 B2
(45) Date of Patent: Jan. 25, 2022

(54) POWER MANAGEMENT FOR VEHICLE-MOUNTED BASE STATION

(71) Applicant: Parallel Wireless, Inc., Nashua, NH (US)

(72) Inventors: Randy Rutherford, Bedford, NH (US); Rajesh Kumar Mishra, Westford, MA (US); David Johnston, Westford, MA (US); Yang Cao, Westford, MA (US); Louis Paquette, Fitchburg, MA (US); Robert Sullivan, Dunstable, MA (US); Michael Yasuhiro Saji, Brookline, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 16/155,514

(22) Filed: Oct. 9, 2018

(65) Prior Publication Data

US 2019/0047495 A1    Feb. 14, 2019

Related U.S. Application Data (63) Continuation of application No. 15/086,030, filed on Mar. 30, 2016, now Pat. No. 10,093,251.

(Continued)

(51) Int. Cl.
*H04L 12/40* (2006.01)
*B60L 1/00* (2006.01)
(Continued)

(52) U.S. Cl.
CPC .......... *H04L 12/40013* (2013.01); *B60L 1/00* (2013.01); *B60R 16/03* (2013.01);
(Continued)

(58) Field of Classification Search
CPC ........ B60L 1/00; B60L 2240/70; B60L 53/60; B60R 16/03; H04L 12/40013;
(Continued)

(56) References Cited

U.S. PATENT DOCUMENTS 6,700,533 B1 * 3/2004 Werb ................... G01S 5/0018
                                                        342/357.48
8,140,358 B1 * 3/2012 Ling ..................... G07C 5/008
                                                        705/4

(Continued)

*Primary Examiner* — Babar Sarwar
(74) *Attorney, Agent, or Firm* — Michael Y. Saji; David W. Rouille (57) ABSTRACT

A base station for providing dynamic power management is disclosed, comprising, a processor within an enclosure mounted in a vehicle, a power management unit coupled to the processor, a controller area network (CAN) bus monitoring system coupled to the power management unit and to a CAN bus of the vehicle, a voltage measurement module also coupled to the power management unit and to a battery of the vehicle; a baseband processor coupled to the processor, a first wireless access functionality coupled to the baseband processor, and a second wireless access functionality coupled to the baseband processor, wherein the power management unit is coupled to each of the first and the second wireless access functionality to enable access radio bringup, access radio shutdown, and graceful user detach based on a power state at the power management unit.

17 Claims, 8 Drawing Sheets

Related U.S. Application Data (60) Provisional application No. 62/140,401, filed on Mar. 30, 2015.

(51) Int. Cl.
  *B60R 16/03* (2006.01)
  *H04W 88/10* (2009.01)

(52) U.S. Cl.
  CPC ......... *H04W 88/10* (2013.01); *B60L 2240/70* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
  CPC ................ H04W 88/10; Y02T 10/7005; Y02T 10/7072; Y02T 10/7291; Y02T 90/121; Y02T 90/128; Y02T 90/14; Y02T 90/16; Y02T 90/163
  See application file for complete search history.

(56) References Cited

U.S. PATENT DOCUMENTS

| | | | | |
|---|---|---|---|---|
| 8,824,430 | B2* | 9/2014 | Ioannidis | H04L 67/14 370/338 |
| 8,899,903 | B1* | 12/2014 | Saad | B60L 53/34 414/392 |
| 9,346,397 | B2* | 5/2016 | Gergets | F21S 10/06 |
| 9,386,480 | B2* | 7/2016 | Papa | H04W 28/10 |
| 9,877,155 | B1* | 1/2018 | Montrose | H04W 4/023 |
| 2001/0034223 | A1* | 10/2001 | Rieser | H04L 29/06 455/404.2 |
| 2006/0003807 | A1* | 1/2006 | Inoue | H04W 88/06 455/561 |
| 2006/0067451 | A1* | 3/2006 | Pollman | H04L 7/043 375/367 |
| 2007/0005609 | A1* | 1/2007 | Breed | G01S 5/0072 |
| 2009/0168843 | A1* | 7/2009 | Waters | G01S 19/34 375/130 |
| 2010/0234071 | A1* | 9/2010 | Shabtay | H04B 7/155 455/562.1 |
| 2010/0287273 | A1* | 11/2010 | Nasir | H04W 48/18 709/224 |
| 2011/0258471 | A1* | 10/2011 | Daniel | H04Q 9/00 713/340 |
| 2011/0270476 | A1* | 11/2011 | Doppler | B60L 53/64 701/22 |
| 2012/0269062 | A1 | 10/2012 | Cho | |
| 2013/0082521 | A1* | 4/2013 | Callicoat | H02J 7/342 307/10.1 |
| 2013/0193753 | A1* | 8/2013 | Brey | B60R 16/0231 307/10.7 |
| 2013/0260805 | A1 | 10/2013 | Park et al. | |
| 2013/0271072 | A1* | 10/2013 | Lee | H04Q 9/00 320/108 |
| 2013/0272274 | A1 | 10/2013 | Ishida et al. | |
| 2013/0313894 | A1* | 11/2013 | Settemsdal | B60R 16/033 307/9.1 |
| 2014/0167778 | A1* | 6/2014 | Todani | G01R 31/396 324/434 |
| 2014/0226513 | A1 | 8/2014 | Hapsari et al. | |
| 2014/0285146 | A1 | 9/2014 | Huston et al. | |
| 2015/0002281 | A1* | 1/2015 | Berkobin | G08G 1/207 340/426.19 |
| 2015/0040113 | A1* | 2/2015 | Muench-Casanova | G06F 9/4406 717/168 |
| 2015/0056995 | A1 | 2/2015 | Baillargeon | |
| 2015/0078167 | A1* | 3/2015 | Papa | H04W 28/10 370/235 |
| 2015/0153754 | A1* | 6/2015 | Klosters | G05F 1/66 327/143 |
| 2015/0207700 | A1 | 7/2015 | Elmdahl et al. | |
| 2015/0217640 | A1* | 8/2015 | Bissontz | B60L 15/20 307/9.1 |
| 2016/0029246 | A1* | 1/2016 | Mishra | H04L 47/12 370/235 |
| 2016/0044450 | A1* | 2/2016 | Huh | H04W 4/02 455/456.3 |
| 2016/0088585 | A1* | 3/2016 | Garg | G01S 19/13 455/456.5 |
| 2016/0150451 | A1* | 5/2016 | Barreto De Miranda Sargento | H04W 48/16 370/332 |
| 2016/0227551 | A1 | 8/2016 | Freeman et al. | |
| 2016/0325767 | A1* | 11/2016 | LeFebvre | B61L 25/021 |
| 2017/0005828 | A1* | 1/2017 | Gino | H04L 12/40039 |
| 2017/0048376 | A1* | 2/2017 | Logan | G05B 15/02 |
| 2017/0208508 | A1 | 7/2017 | Laraqui et al. | |

* cited by examiner

POWER MANAGEMENT FOR VEHICLE-MOUNTED BASE STATION

CROSS-REFERENCE TO RELATED APPLICATIONS

This application is a continuation of, and claims the benefit of an earlier filing date under 35 U.S.C. § 120 based on, U.S. patent application Ser. No. 15/086,030, filed Mar. 30, 2016, and entitled "Power Management for Vehicle-Mounted Base Station", which itself claims the benefit of priority under 35 U.S.C. § 119(e) of U.S. Provisional Patent Application No. 62/140,401, filed on Mar. 30, 2015 and entitled "Power Management for Vehicle-Mounted Base Station," which are each hereby incorporated by reference in their entirety for all purposes. The present application also hereby incorporates by reference U.S. patent application Ser. No. 14/311,829, "Methods of Incorporating an Ad Hoc Cellular Network into a Fixed Cellular Network," filed Jun. 23, 2014; U.S. patent application Ser. No. 14/311,835, "Methods of Incorporating an Ad Hoc Cellular Network into a Fixed Cellular Network," filed Jun. 23, 2014; U.S. patent application Ser. No. 14/998,508, "Methods of Incorporating an Ad Hoc Cellular Network into a Fixed Cellular Network," filed Jan. 5, 2016; U.S. patent application Ser. No. 14/453,365, "Systems and Methods for Providing LTE-Based Backhaul," filed Aug. 6, 2014; U.S. patent application Ser. No. 14/454,670, "Multi-RAT Node Used for Search and Rescue," filed Aug. 7, 2014; U.S. patent application Ser. No. 14/864,194, "Radio Operation Switch Based on GPS Mobility Data," filed Sep. 24, 2015; U.S. patent application Ser. No. 14/946,749, "Enhanced Mobile Base Station," filed Nov. 19, 2015; U.S. patent application Ser. No. 14/868,074, "Enabling High-Power UE Transmission," filed Sep. 28, 2015; and U.S. patent application Ser. No. 14/923,392, "Out-of-Band Power Down Notification," filed Oct. 26, 2015, each in its entirety for all purposes.

BACKGROUND

It is well-known to use the current ignition state of a vehicle to power components in the vehicle on and off. For example, when a driver turns the key in the ignition, the electrical system of the vehicle attempts to send power to the ignition system (spark plug, starter), and once the engine has been started, the electrical system then sends power to components of the vehicle that use electricity, such as the air conditioner, the radio, lights, locks, etc. However, when providing a mobile base station in a vehicle, it is desirable to have greater intelligence in providing electrical power to the vehicle-mounted base station.

Vehicles typically provide central controller systems that monitor power loads, power current, voltage monitoring, and other power management functions. For example, the Texas Instruments TMS470 ARM Cortex-M Safety MCU provides connectivity to such functions and also to one or more controller area network (CAN) buses. Central controllers also provide monitoring of load and demand among distributed loads. The load monitoring system may provide monitoring of system power loads, which may be a direct battery connection. In some embodiments, the load monitoring system may be enabled to turn off nonessential systems, such as seat warmers/heaters and cigarette lighters, to reduce electrical load in certain situations.

SUMMARY

Systems and embodiments are disclosed for power management in a vehicle-mounted base station. The base station may be a small cell base station, a Wi-Fi base station, a Long Term Evolution (LTE) eNodeB, a Universal Mobile Telephone System (UMTS) nodeB, a converged wireless system supporting more than one air interface, or another base station. Such a base station is described in U.S. patent application Ser. No. 14/183,176, entitled "Methods of incorporating an ad hoc cellular network into a fixed cellular network," hereby incorporated herein in its entirety for all purposes. Power management is used herein to mean both electrical power management, and in some cases, radio power management.

In one embodiment, a base station for providing dynamic power management is disclosed, comprising: a processor within an enclosure mounted in a vehicle; a power management unit coupled to the processor; a controller area network (CAN) bus monitoring system coupled to the power management unit and to a CAN bus of the vehicle; a voltage measurement module also coupled to the power management unit and to a battery of the vehicle; a baseband processor coupled to the processor; a first wireless access functionality coupled to the baseband processor; and a second wireless access functionality coupled to the baseband processor, wherein the power management unit is coupled to each of the first and the second wireless access functionality to enable access radio bringup, access radio shutdown, and graceful user detach based on a power state at the power management unit.

The voltage measurement module may be coupled to both of an always-on power circuit of the vehicle and an ignition power circuit of the vehicle simultaneously. The power management unit may further comprise a timer for providing power to at least one of the Wi-Fi and base station functionalities after an ignition is turned off, thereby providing runlock functionality. The power management unit may further comprise instructions that, when executed on the processor, cause the power management unit to be in one of: a first ignition off state reflecting an accessory electrical mode of the vehicle, an ignition on state reflecting an ignition on electrical mode of the vehicle. The power management unit may further comprise instructions that, when executed on the processor, cause the power management unit to be in one of a second ignition off state reflecting greater than a set period of inactivity in the first ignition off state, a cranking state reflecting engagement of a starter of the vehicle, and a shore power state.

The base station may provide Wi-Fi and Long Term Evolution (LTE) access functionalities. The base station may utilize direct current (DC) power, or may utilize alternating current (AC) power, and further comprises an inverter coupled to the battery of the vehicle, the inverter configured to return to a powered-on state after a transient fault without manual intervention. The base station may further comprise a button located on a dashboard of the vehicle configured to turn the base station on when pressed. The base station may further comprise a global positioning system (GPS) module and a geofencing module coupled to the GPS module and the processor, the geofencing module being coupled to the power management module, the geofencing module being for determining whether a given radio access technology should be activated or deactivated based on a location received from the GPS module, the GPS module being coupled to a GPS antenna mounted exterior to the vehicle. The power management unit may further comprise a detector for determining whether shore power is being provided and for instructing the power management unit to change its power management state. The power management unit may be configured to use always-on circuit power to maintain an approximate temperature of a temperature-controlled chamber of a crystal oscillator in the base station. The first and the second wireless access functionalities can be coupled to radio antennas exterior to the vehicle. The CAN bus monitoring system is coupled to the base station via a Universal Serial Bus (USB) port and to the CAN bus of the vehicle via an on-board diagnostic (ODB) port of the vehicle.

In another embodiment, a method for dynamic power management of an in-vehicle base station is disclosed, comprising: monitoring a vehicle controller area network (CAN) bus of a vehicle for power-related messages; monitoring a positioning sensor to determine a location of the vehicle; monitoring a voltage of an electrical circuit in the vehicle to determine a power management state; and conducting an orderly shutdown of radio frequency services based on the power-related messages, the location of the vehicle, and the power management state. The radio frequency services may further comprise a Wi-Fi access network and a Long Term Evolution (LTE) access network, and wherein the positioning sensor is a global positioning system (GPS) positioning sensor. The orderly shutdown may further comprise detaching users, handing users over to another base station, or updating a routing configuration of a mesh network.

In another embodiment, a method for bringup of an in-vehicle base station is disclosed, comprising: powering on a base station in a vehicle; identifying a power management state of the vehicle; searching for mesh nodes to provide a connection for the base station; activating a Long Term Evolution (LTE) user equipment (UE) coupled to the base station; attempting to connect to an LTE network using the LTE UE; applying a configuration from a mesh node, an LTE network, or a radio frequency environment discovered by the UE; and based on the applied configuration and based on the power management state of the vehicle, determining whether to activate a radio frequency access network. The radio frequency access network may be an LTE access network or a Wi-Fi access network.

DETAILED DESCRIPTION

An explanation of voltage in a typical vehicle follows. In a vehicle, an electrical circuit is formed by an electrical connection between the positive terminal of a battery and the negative terminal. The negative terminal is connected to the chassis of the car, which for purposes of the electronics in the car serves as the ground. The positive terminal of the battery is connected to the load. All load devices are connected to the chassis of the vehicle, thereby completing the circuit. These circuits are direct current (DC). Three main circuits can be understood to be present in a vehicle: an ignition circuit, operated by key or more recently by push-button, which connects to the starter and to the engine; an accessory circuit, which is also controlled by the car key or push button and powers a variety of equipment that is available when the engine is not running; and an always-on circuit that powers certain equipment even when the engine or push button is not in an on position. Examples of equipment connected to the accessory circuit include: car heater and car radio. Examples of equipment connected to the always-on circuit include: cabin dome lights, brake lights, and other lights. If equipment connected to the always-on circuit is not turned off, the battery may be drained and the car may need to be jump-started. Different vehicles may have equipment connected to different circuits.

Emergency vehicles have greater electrical needs than consumer vehicles. In most cases, police cars and other such vehicles are able to meet their electrical needs using larger-capacity batteries. In some cases, such as for certain fire engines, the voltage of the vehicle is higher to power its equipment, e.g., 24 V instead of 12 V. However, the typical pattern of load in emergency vehicles is similar to that found in consumer vehicles. Police lights, police radios, and other equipment may be connected to either the ignition circuit or the accessory circuit, as these types of equipment draw significant power and are not required to be on while the operator is not in the car. In operation, police officers tend to run their engines to power their equipment in most cases. One special case is when an officer stops and exits the car, and does not desire the ignition to be on (so as to prevent another person from stealing the car). The officer may still need to use, for example, lights, cameras, and radios during a police stop. A timer is often installed in police vehicles to enable specified equipment to continue to operate after the ignition is turned off; this is often called a "run-lock" or "runlock" system.

In some embodiments as described herein, an in-vehicle base station is described. The in-vehicle base station is installed as electrical equipment in a vehicle such as described above, and is intended to provide base station functionality, so that an emergency responder may have cellular coverage at all times, including in areas where ordinary cell service is not available, or where coverage is weak. A "CWS," or Parallel Wireless Converged Wireless System, is such an in-vehicle base station, and provides either Long-Term Evolution (LTE)/4G, UMTS/3G, Wi-Fi, or some combination of coverage thereof. An in-vehicle base station such as the CWS may also provide land mobile radio (LMR) support, including bridging or interworking of LMR, P25, or other protocols to industry-standard LTE and other protocols. In-vehicle base stations may also be designed to operate in conjunction with other base stations in a mesh configuration, and/or in conjunction with an existing cellular network for providing network connectivity back to a mobile operator network and/or the public Internet (this connectivity is called backhaul connectivity, or simply backhaul). Where used herein, the words in-vehicle base station, vehicle-mounted base station, mobile base station, base station not otherwise specified (except when clearly intended to mean a conventional base station), CWS, etc. are intended to mean the same type of base station as described variously throughout this disclosure.

In some embodiments, an in-vehicle base station may require significant electrical power in order to broadcast its signal. For example, a mobile base station may use 5 W of power to broadcast a 0.25 W Wi-Fi access radio signal; 5 W to broadcast a 0.5 W mesh network signal; 5 W to broadcast a 0.5 W LTE backhaul signal; and 15-20 W to broadcast a 4 W LTE access signal. In the case where a single base station provides all of these functionalities, the total power draw may reach 30-40 W for the radio circuitry, with additional components contributing to the total load. A typical mobile base station may thus use approximately 70 W of power at peak operating load. It is possible, however, for a mobile base station to vary its electrical load based on what functionality is turned on.

The power needs of a mobile base station make a connection to the ignition circuit desirable. The ignition circuit is desirable because the always-on circuit and accessory circuit both do not reap the benefit of the motor and alternator recharging the battery and allowing for greater load. However, an always-on circuit connection may also be used in conjunction, to provide continuous power to specialized components such as volatile memory or oven-controlled crystal oscillators. If a connection to the accessory circuit or always-on circuit is used for primary power, greater battery power may be required, and indeed such circuitry may be available in vehicles with electric drive mode, hybrid drive mode, or other electric powertrain technology. Two-battery or multiple battery scenarios are, of course, also possible, and a mobile base station may be connected to a battery independent of the motor vehicle or may be connected to an independent battery in conjunction with the connection to the motor vehicle battery, with one battery potentially being designated the primary battery.

When a mobile base station is connected to a vehicle electrical circuit, such as an ignition circuit or accessory circuit, the mobile base station should be either capable of DC power, or should be equipped with an inverter to change DC power to AC power. An inverter in an AC power configuration may be specified not to require a hard reset in case of surge or transient fault. This is because manual intervention to perform a hard reset often detracts from the vehicle operator's primary duties, such as police duties or simply driving of the motor vehicle. This is also because in some cases a mobile base station may not be installed in a location where a hard reset of the inverter or the base station is conveniently possible for the vehicle operator. For example, the mobile base station may be installed in a vehicle trunk or in a locked closet or compartment in the vehicle.

A mobile base station may be required to be protected from surges and changes in voltage. Automotive power supplies are designed to cope specifically with the voltage changes that arise when a vehicle is started; specifically, the starter motor of a car can drop the resting battery voltage from 12 V down to 7 or 8 volts while drawing current to start the car. An inverter or DC power supply for a mobile base station may be specified to compensate for these surges and voltage changes. If a base station is connected to an accessory circuit and it is desirable for power to continue flowing to the base station during the vehicle start process, the vehicle may be equipped with capacitors to provide power during the ignition voltage cutout, for vehicle ignition cranking times of approximately 20 seconds.

Basic power management for a mobile base station may include an on/off power switch, in some embodiments. The switch may be a momentary-type switch with software control, such that a user may be able to turn the device on but may be overridden in software when attempting to turn the device off, if it is not desirable for various reasons. The switch may be located on the device itself, or it may be located in the dash or in another portion of the vehicle for more convenient operation by the operator of the motor vehicle. The switch may be connected to the mobile base station via various means. For example, the switch may be located on the CAN bus of the vehicle, with its own CAN bus microcontroller, and the switch may send messages sent via the CAN bus module of the mobile base station to turn the mobile base station on or off. Or, the switch may be directly electrically connected to the base station via its own bus or via a simple relay. Alternately, in some embodiments, a mobile base station may use an app on an iPad or iPhone or other device paired wirelessly, via Wi-Fi, Bluetooth, or another wireless means to control power. The wireless control protocol may be enabled using an electrical connection to the always-on electrical circuit, so that the wireless protocol is available at all times.

Power management may also be facilitated by communicating with other devices in the vehicle via the vehicle CAN bus.

In some embodiments, a bus known as the CAN bus can be used in the vehicle. The CAN bus is a common low-speed serial bus used to allow various systems within a vehicle to communicate. The CAN bus is a message-based protocol, and has been standardized under the CAN Specification 2.0 Part A and B, hereby incorporated by reference herein in their entirety. Other in-vehicle buses may be used in place of the CAN bus, wherever the CAN bus is referred to below. The CAN bus is designed such that all devices on the bus are able to detect, via variations in voltage on the bus, signals sent to any device on the bus. A mobile base station may have a CAN bus microprocessor allowing it to decode CAN bus signals, including signals intended for other components of the car, and use them for power control. The mobile base station may use a universal serial bus (USB) CAN bus adapter containing a CAN bus microcontroller, in some embodiments, to interface with the CAN bus. The electrical input power connection may be monitored, in some embodiments, and its voltage may be used to determine the power state of the mobile vehicle, in lieu of or in combination with messages from a CAN bus.

In some embodiments, the mobile base station may be connected to the CAN bus and may turn itself on or off, or may be turned on or off, based on the state of the vehicular information bus. The bus may be a controller area network (CAN) bus protocol bus, a CAN-C bus, a CAN-IHS bus, a CAN-A/T bus, or another bus, such as an on-vehicle Ethernet network. The bus may be another network, such as a local interconnect network (LIN) network. The base station may communicate with a vehicle systems interface module (VSIM) to determine bus information and/or communicate information to the VSIM. An engine control module (ECM) may also be on the CAN bus and its ignition state may be monitored for various purposes, in some embodiments.

The CAN bus may use vehicle events to control the operation and/or power state of the vehicle-mounted base station. The opening of a door; the turning of a key in the ignition to turn the ignition on or off; the state, powering on, and/or powering off of other devices in the car such as the radio, internal or external lights, locks, audio, air conditioning, environmental heating, seat heaters, police radio, police computer, police/taxi interface module, police lights, dash camera, global positioning system (GPS), or other devices;

the operation of an alarm key fob; or other events may be vehicle events. Any or all of these events may be used for turning a mobile base station on or off. For example, a CAN bus may be used to determine, for some vehicles, whether a person is seated in the passenger seat or driver's seat. If an operator is in the seat, a mobile base station may elect not to turn off completely and instead may elect to maintain power to one or more access radios, in some embodiments.

Power messages may be obtained from the CAN Bus, including power threshold messages/load management messages. For example, certain CAN bus implementations provide signals such as ignition power on, accessory power only, essential power only, no power, etc. In some embodiments, the base station may communicate with a body control module (BCM), via the CAN bus, to determine the state of the battery. The BCM may perform active load shedding to rehabilitate the state of the battery when the battery is in a low charge state. The base station may communicate with the BCM in the low charge state, by receiving BCM messages broadcast over the CAN bus. In some embodiments, such as in electric vehicles and hybrid electric vehicles with a sophisticated battery management system, the base station may communicate with the battery management system in addition to or in place of communication with a BCM. A mobile base station according to this disclosure may interoperate with these messages and can turn off functionality as needed in an orderly fashion. In some embodiments, communications with a battery control or battery management system may be over a broadcast message medium, a point-to-point message medium, or another message medium.

In some embodiments, a mobile base station may be installed in a vehicle with load shedding functions built into its electrical system. The mobile base station may monitor load so that, e.g., non-essential functions are turned off when load increases (such as when power-hungry lights are on, etc.). A load shedding system interfaces with a load monitoring system and is configured to power off non-essential systems when battery voltage is low, to meet electrical demands of other equipment, and so on. In some embodiments, the mobile base station may be connected to the load shedding system via the vehicle CAN bus, and may send messages via the CAN bus to request to remain powered on when powering off nonessential systems. The mobile base station may also receive power down notifications from the CAN bus and may be configured to reduce its power usage in an orderly fashion. In some embodiments, the mobile base station may turn off its access radios first before its backhaul radios. In some embodiments, the mobile base station may turn off first its Wi-Fi access radio, then its mesh access radio, then its LTE access radio, before turning off its LTE backhaul radio. In some embodiments, the sequence of radios to be turned off may be configurable. In some embodiments, timers used by the mobile base station, such as for the runlock features of the mobile base station, may be reset based on received CAN bus messages. In some embodiments, certain functionality of the mobile base station may be tagged or identified as essential (e.g., LTE backhaul) or non-essential (e.g., Wi-Fi access radio, which is not necessarily needed to provide network access to a police laptop in a vehicle configured with a hard-wired network connection to a network switch in the vehicle). All timers described herein may be configurable, including the runlock timer described in this paragraph.

As described above, a mobile base station may interoperate with a runlock functionality of a vehicle. When runlock is engaged, a vehicle may be configured to provide access while the ignition is off, just like the vehicle provides lights and radios in runlock mode. In some embodiments, this may be done using an existing runlock timer. For example, if a timer is engaged on the ignition circuit providing runlock functionality for all equipment on the ignition circuit, this may be used by the mobile base station. In other embodiments, this functionality may be enabled specifically for the mobile base station using a battery or other functionality. A configurable timer may be used to ensure that, for example, power to the mobile base station continues for 30 min after ignition is cut. After the timer runs out, the base station may additionally make a determination in software to remain powered on, such as if the mobile base station is aware that user devices are still connected to the base station. The base station may be configured to start a runlock mode when all users have disconnected, or may be configured to add time to the timer if, when the timer reaches zero, a user is still connected.

In some embodiments, the runlock timer may be set to, for example, ten minutes, thirty minutes, one hour, or another period of time. In some embodiments, when a vehicle event occurs, the timer may be set. For example, when the ignition is turned off, the timer may be set to ten minutes from the present time. Once the timer expires, the vehicle-mounted base station may be turned off, or may turn itself off, or may request to be turned off. Before the timer expires, the vehicle-mounted base station may reset the timer based on one or more vehicle events. For example, if a door is opened, the vehicle-mounted base station may reset the timer, as a user is either exiting the car or reentering the car, and may wish to use the vehicle-mounted base station for more time. For some events, a continued active state may be used to reset the timer. For example, if a squad car's exterior emergency lights remain on, the powered-on state of the lights may be used to reset the timer. A battery low state may result in the timer being reset to zero and the mobile base station determining that it should turn itself off, in some embodiments.

In some embodiments, the vehicle-mounted base station may monitor the CAN bus or other bus, may monitor vehicle state and/or battery state, and may maintain the runlock timer using this information. The vehicle-mounted base station may use the timer to provide warnings to relevant users of when the vehicle-mounted base station will be powered off. In some embodiments, the runlock state of other devices, such as emergency lights or dashcam, may be used to determine whether the mobile base station should be powered off.

In some embodiments, always-on power may be used. Certain features benefit from being powered even when the rest of the base station is powered off. For example, base stations require high-quality timing signals to maintain sync with macro base stations. Typically, oven-controlled sync crystal oscillators can be used for this task. However, such crystals operate within a particular temperature range, and thus need to warm up to adequate temperature before being used. Always-on power may be used to heat a crystal oven so that when the base station is activated, sync is immediately available. Crystal oscillator ovens require very little power, and may be powered by a battery over a period of hours or days without the battery requiring to be recharged.

In some embodiments, shore power may be used. Shore power is power that is provided via plugging into a garaging facility, such as for emergency vehicles or boats. Shore power allows emergency vehicles such as ambulances and fire engines, which have a large quantity of power-hungry equipment, to keep their equipment powered on without draining the vehicle battery. When shore power is available, a mobile base station may be enabled indefinitely to activate certain features. Detection of shore power may be performed by monitoring the CAN bus, by monitoring vehicle circuit voltage, or via another means. When shore power is disconnected, the mobile base station may perform an orderly shutdown.

In some embodiments, a mobile base station may monitor non-electrical aspects of vehicle state and use this information for power management. For example, the mobile base station may automatically turn off LTE access when the vehicle is driven above a particular speed, or the vehicle drives away from a particular location using accelerometer or GPS. The mobile base station may interact with other vehicles and use other vehicle state for power management as well. For example, if multiple base stations are meshed together at a disaster site, with one mobile base station providing the backhaul for the other base stations, the backhauling node may identify when it is being driven away and may require another mesh node to provide backhaul capacity. Or, as another example, a mesh node can request that its backhaul node continue to stay active. A node that is providing access to UEs or mesh nodes may elect to stay active, in some embodiments. Each vehicle can report its voltage level to others, so that multiple mesh nodes that are close together can hand off base station responsibilities to other nodes as necessary when battery is depleted. One vehicle can act as a master, others as slaves, in some embodiments.

In some embodiments, the accelerometer status of other vehicles may be used to perform coordination as described. For example, a mobile base station may turn itself on to full power when the vehicle is stopped, reduced power while the vehicle is in motion, and turned off when the vehicle is stopped and located at the vehicle's home berth, e.g., a police station.

In some embodiments, geofencing may be used to control power state of the mobile base station. For example, e.g., around police station, a mobile base station may not need to activate its access radios, as all personnel in the area may already have access using the base stations in the police station. GPS information may be used to trigger the geofence. Configuration of the geofence may be performed remotely, in some embodiments, and may be based on proximity via GPS. A GPS antenna may be provided in conjunction with the mobile base station, with a roof-mounted antenna connected electrically to the mobile base station. The GPS antenna may also provide information about proximity to other vehicles, in some embodiments. In another embodiment, monitoring signal levels may be used instead of or in conjunction with a geofence, so that power is not used for turning on access radios when other signals are active. Geofencing may be useful, for example, when a shift change causes many vehicles to return to the station, or when vehicles reach a maintenance facility where coverage enhancement may typically not be required. In some embodiments, access radios may be turned off when other vehicles are reported to be within a particular GPS radius, or all radios but the backhaul and mesh radios may be turned off in such instances.

In some embodiments, an operator may be provided various information about the mobile base station and may be given the ability to perform power control, including all of the various information described herein used for determination of the mobile base station's power state. As a specific example, an LED signal meter may be installed in the dashboard of the vehicle, in some embodiments, and configured to provide a visual indicator of signal strength in the current area using a stacked LED display with, for example, red, amber, and green colored indicators, or signal bars such as shown on mobile handsets. Signal strength may show the strength of a macro cell's coverage in the area. When the visual indicator shows little or no signal, the vehicle operator may choose to activate the mobile base station access radio for auxiliary coverage, using a power button next to the LED signal meter in the dash. In some embodiments, a faceplate may be provided in the dashboard with a stacked LED signal meter and a power switch. In some embodiments, a touch screen or button-driven interface to the mobile base station may be provided in the dashboard. In some embodiments, control of the mobile base station may be enabled by a software integration into an existing tablet or touch screen device of the vehicle.

In some embodiments, a wake-on-LAN or wake-on-access functionality may be provided, such that a mobile base station may wait for a mobile device to connect to it, for example to a low-power access signal, and may then turn on its primary functionality, including access radios. In some embodiments, a mobile base station may require cooling; in such instances, the mobile base station may turn on, turn off, maintain or otherwise control fan power or air conditioning power to ensure adequate cooling in addition to its own power load.

Handling of low-power situations may include, in some embodiments, monitoring power level and determining that the vehicle battery is drained. If a vehicle has been parked and has been running in a runlock mode, i.e., without the engine running, the battery may reach a drained state. This may occur if, for example, the mobile base station is providing wireless coverage to a disaster site for a prolonged period of time, or if a higher radio power level is being used to increase signal coverage or building penetration distance. The vehicle power controller may send out an indicator message via the CAN bus, and the mobile base station may, in some embodiments, take one or more of the following actions. The mobile base station may initiate an audible or visual alert to the vehicle operator, instructing the operator to turn on the engine. The mobile base station may send an alert to a mobile device or more than one mobile device, for example, to the mobile devices attached to the mobile base station. The mobile base station may enter into a power shedding mode, reducing power draw by reducing power output or turning off radios and functionality that are not currently in use. In some cases the mobile base station may be enabled to cause the vehicle to turn on the vehicle ignition, thereby charging the battery and enabling continued operation.

Figure 1:
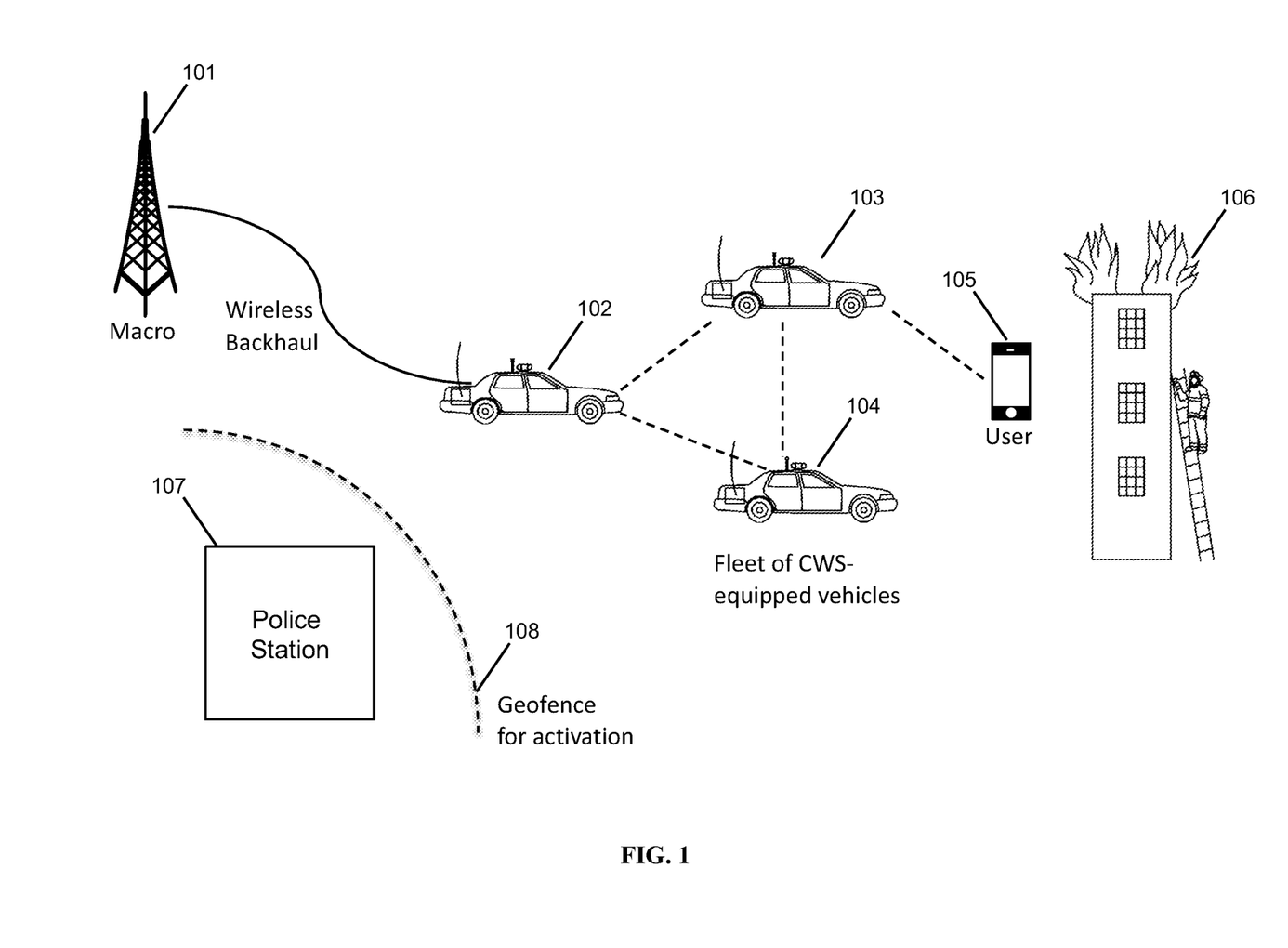
FIG. 1 is a schematic diagram of a mesh network of vehicle-mounted base stations, in accordance with some embodiments.

FIG. 1 is a schematic diagram of a mesh network of vehicle-mounted base stations, in accordance with some embodiments. Macro cell 101 provides LTE backhaul to in-vehicle base station 102, which is in an emergency vehicle. Base stations 103 and 104 are also mounted in emergency vehicles and are meshed to base station 102. Mobile base station 103 provides LTE access to user 105, who is at disaster site 106; service to user 105 is backhauled by mobile base station 102 and macro cell 101. Mobile base station 103 may be in a runlock mode, with its ignition off, and may keep its LTE access radio on until its battery is drained, after which it may request that mobile base station 104 provide service to user 105. Base station 102 may similarly be running in a runlock mode, and may remain active as long as necessary to provide backhaul to user 105. If power runs out for more than one vehicle and service becomes unavailable, user 105 may receive a notification, or the operators of each mobile vehicle may be notified to turn their vehicles on to recharge batteries in the vehicles. Elsewhere, a police station 107 is surrounded by geofence 108, based on GPS coordinates. When vehicles 102, 103, 104 enter inside the geofence, the in-vehicle base stations in the vehicles are configured to turn off automatically, as sufficient signal is available in the area near the police station. Activation of the vehicle radios is enabled outside the geofenced area.

Figure 2:
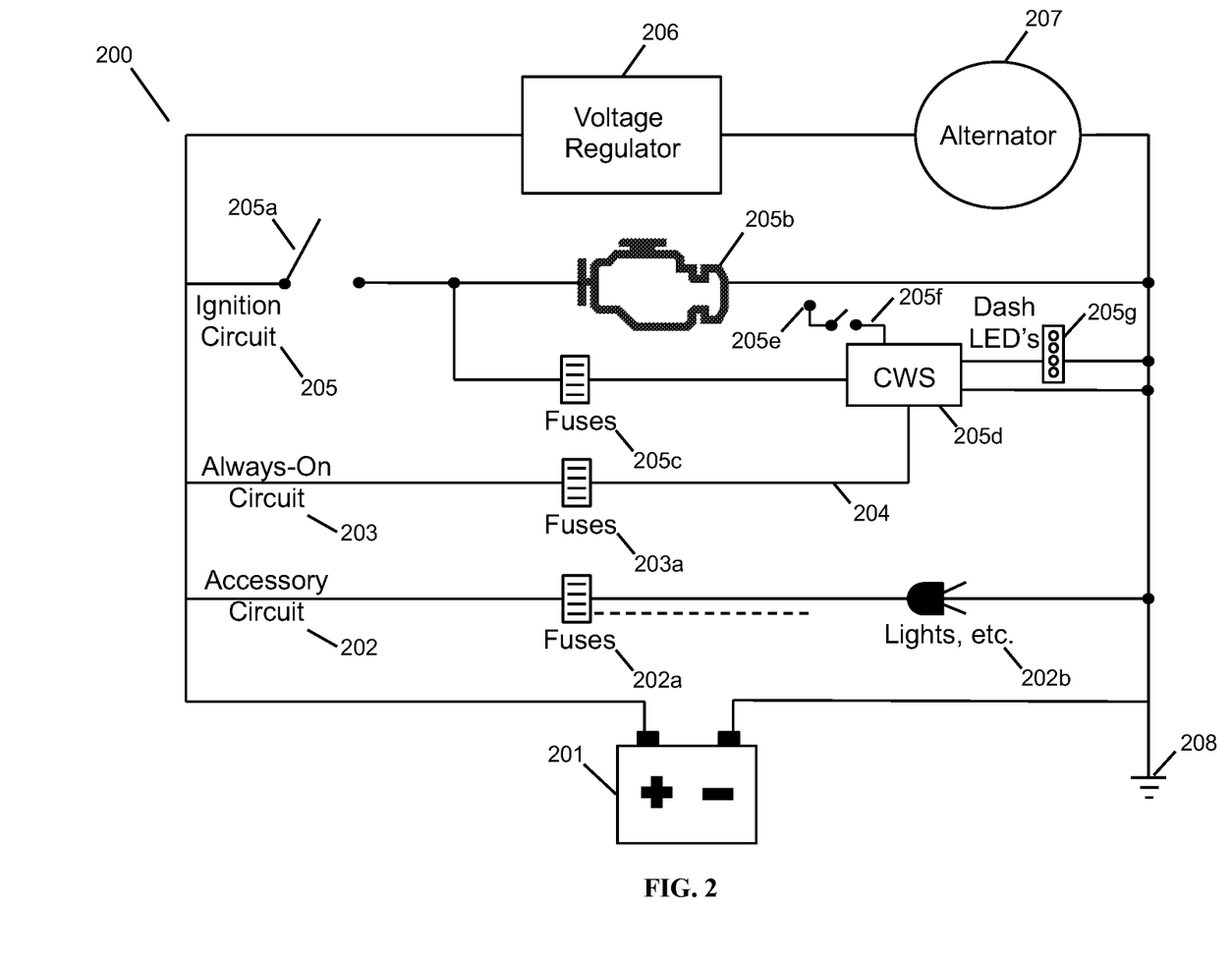
FIG. 2 is a circuit diagram of electrical connections for a vehicle-mounted base station, in accordance with some embodiments.

FIG. 2 is a circuit diagram of electrical connections for a vehicle-mounted base station, in accordance with some embodiments. Circuit diagram 200 shows battery 201, which powers the vehicle, connected to accessory circuit 202, always-on circuit 203, ignition circuit 205, voltage regulator 206 and alternator 207 before connecting to ground 208 (e.g., the vehicle chassis). The voltage regulator and alternator serve to recharge the battery when the motor 205b is on. When the motor is on, the voltage of the system is slightly higher than the voltage of the battery, as a result of the alternator, resulting in the battery regaining charge.

Accessory circuit includes fuses 202a, and lights 202b that are connected via a fuse. Lights 202b are connected to the vehicle chassis, completing the circuit. Lights 202b are available when the vehicle is turned off, but require the car's ignition key to be turned to the accessory position (or, if a push-button start mechanism is used, an accessory position of the push-button starter). In some vehicles, the accessory circuit is activated whenever the key is in the ignition and turned past the accessory position, so that equipment on the accessory circuit, such as the radio and environmental heater are able to be turned on when the ignition is on as well as when the ignition is off and the key is in the accessory position.

Always-on circuit 203 includes fuses 203a, and a connection 204 to mobile base station (Parallel Wireless Converged Wireless System (CWS)) 205d. CWS 205d has a connection to vehicle ground 208, completing the circuit. Mobile base station 205d may use always-on circuit 203 to provide a small amount of power to certain functions of the base station, such as maintaining volatile memory, maintaining a clock, maintaining a temperature of an oven-controlled oscillator, etc.

Ignition circuit 205 includes ignition switch 205a, which requires the key to be turned to the ignition position before closing the circuit. The ignition circuit is coupled to engine 205b to start the engine, not shown is the engine starter, which may be different in different vehicles. The ignition circuit is also coupled to fuses 205c. Each item connected to the ignition circuit typically has its own fuse, and one of these items is CWS 205d, configured as shown to be powered primarily by the ignition circuit while the vehicle is turned on. Although a runlock circuit is not shown, an additional battery connection is required in order to enable CWS 205d to run when the ignition is off. Button 205e located on the dashboard connects to switch 205f, enabling manual control of the power of CWS 205d. In some embodiments, a software switch may be used instead of the hardware switch 205f shown. CWS 205d controls dashboard LEDs 205g, which show signal level of macro coverage in the vicinity; this is based on signals received from a UE modem resident within CWS 205d. Dash LEDs 205g and CWS 205d are connected to ground 208.

Figure 3:
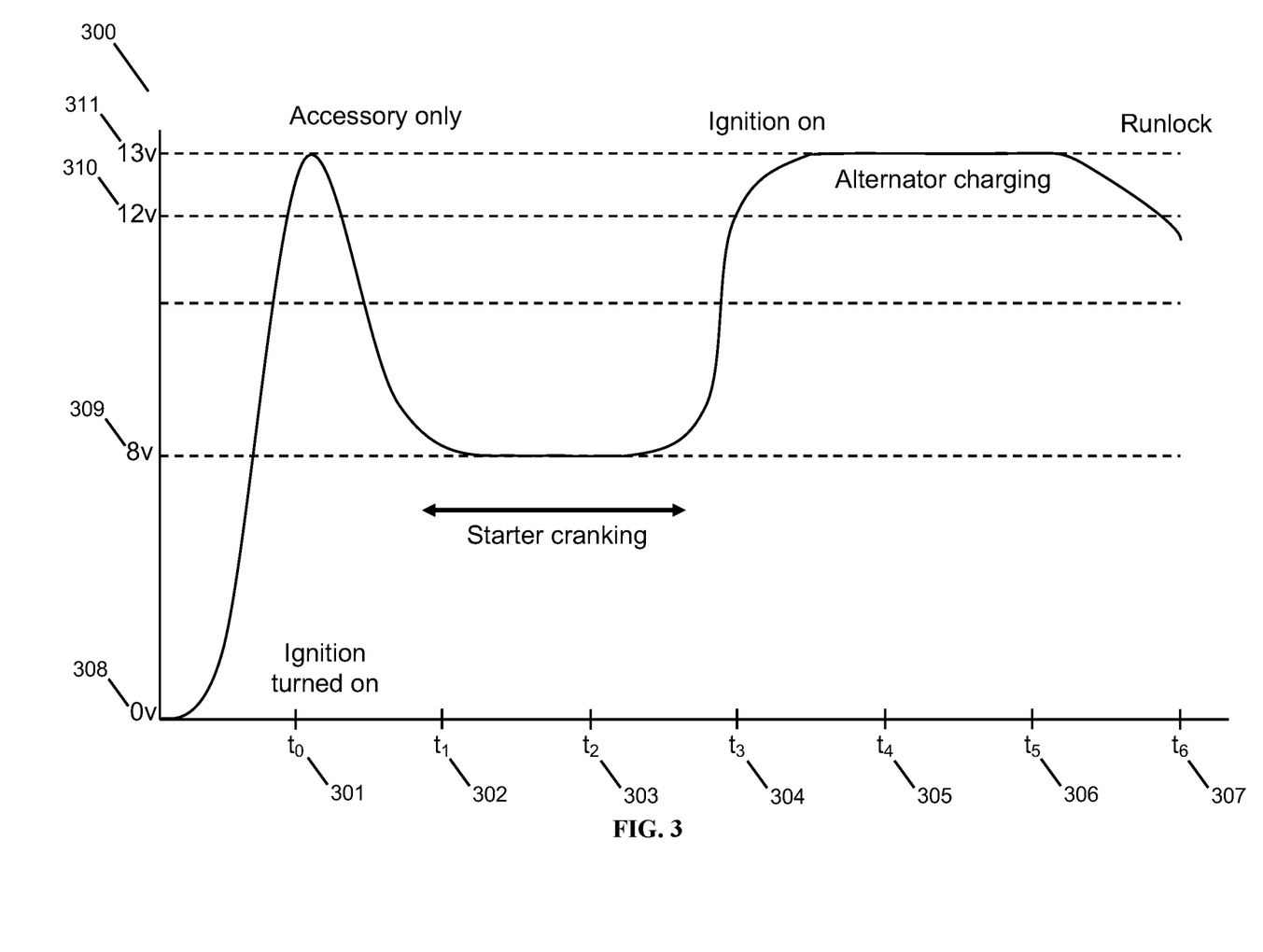
FIG. 3 is a voltage plot over time of a voltage in a vehicle electrical circuit, in accordance with some embodiments.

FIG. 3 is a voltage plot over time of a voltage in a vehicle electrical circuit, in accordance with some embodiments. Voltage plot 300 shows the state of voltage over time in a typical vehicle system. At state t0 (301), voltage is zero (308) and the vehicle electrical system is turned off. In reality a very small voltage is present in the system and current is being drawn by equipment on the always-on electrical circuit. At state t1 (302), an operator of the vehicle turns the key in the ignition to the accessory position, which connects the battery to the accessory connection and which causes voltage to rapidly rise to a high level, here 13 V (311). This level is higher than the level found when the vehicle is operating, and measurement of the voltage can be used to determine that the system is in an accessory voltage state. Next, at time t2 (303), the mobile operator turns the key to the ignition position, which leads to a drop in voltage to 8 V (309). 8 V is too low for operation of most of the equipment in the vehicle, including the in-vehicle base station. It is worth noting that, for small values of t2−t1, it is desirable to avoid booting the in-vehicle base station and then immediately turning it off as a result of triggering the ignition. A method for avoiding this scenario will be shown in FIG. 4.

The engine starter is shown as keeping the voltage at 8 V (309) until time t3 (304). At this time, the ignition is now on, and power rises back to 12 V (310) at time t4 (305). This is the normal operating voltage of the vehicle. The base station may be activated at will or automatically at this time. Since the ignition is on, the alternator causes the voltage to slowly rise above 12 V.

At time t5 (306), the vehicle operator stops the engine. In some cases runlock mode may be active, and electrical systems such as lights and dashcams, as well as any mobile base station radios, may continue to be active for a set time as determined by the runlock timer configuration. Since the engine is no longer running, the voltage of the system rapidly drops until it reaches a low voltage threshold at time t6 (307). At the configured low voltage threshold, power management systems may send messages via a CAN bus to cause the mobile base station to shut down, or in some embodiments, the mobile base station may monitor the system voltage and identify for itself when it should shut down.

Figure 4:
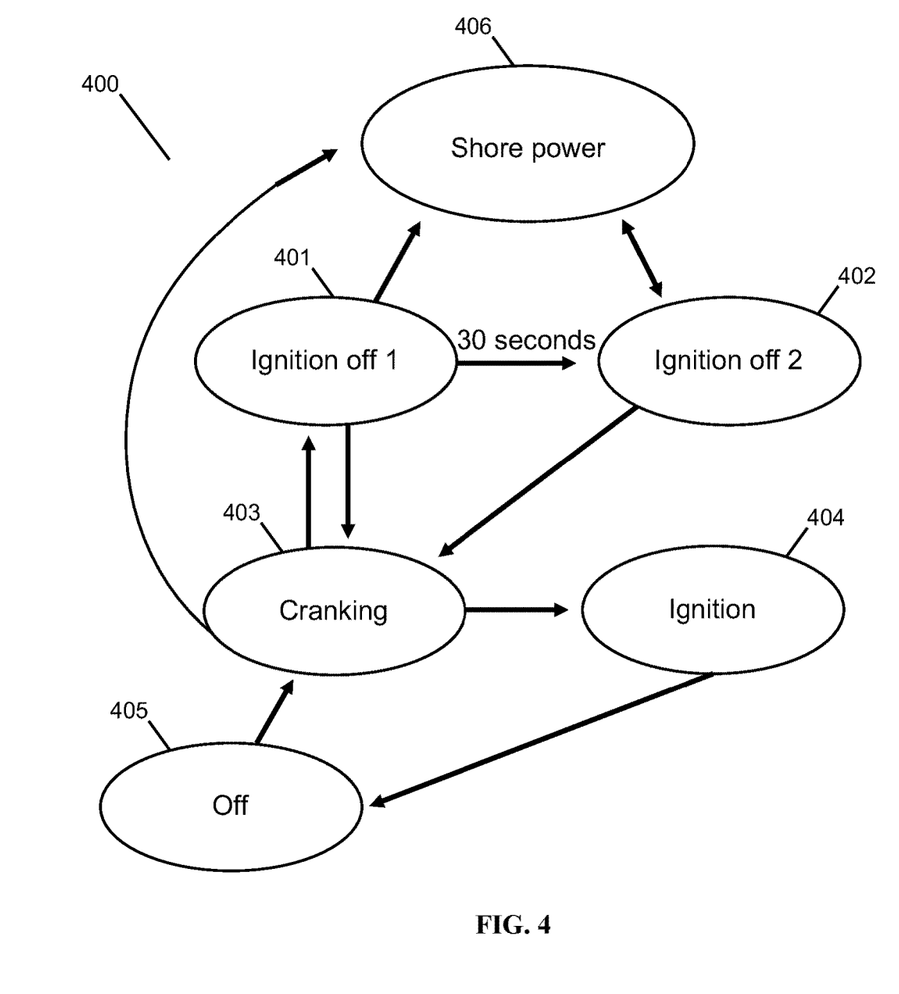
FIG. 4 is a state diagram of power management states in a power management unit for a vehicle-mounted base station, in accordance with some embodiments.

FIG. 4 is a state diagram of power management states in a power management unit for a vehicle-mounted base station, in accordance with some embodiments. The vehicle-mounted base station is connected to a vehicle ignition circuit for power, and receives power when the key is in the ignition, including when the key is in the ignition state. State diagram 400 shows six states characterizing the operation of a mobile base station. Starting at state 401, when the ignition is off, the base station may enter into any of: a shore power state 406; a cranking (i.e., ignition in process) state 403; and a second ignition off state 402. From the second ignition off state 402, the choices are the cranking state 403 and the shore power state 406.

These states interoperate as follows. When a vehicle operator turns the key in the ignition to the accessory state, power may flow to the mobile base station, in some embodiments, causing the mobile base station to turn on and enter state ignition off 1 401. However, the operator may or may not immediately turn the key to the ignition position. In the case that the key is not turned to the ignition immediately, and an activation timer expires (here shown as 30 seconds), a transition is made from state 401 to state 402. The mobile base station may take note that the electrical environment of the vehicle has not changed in several seconds, perhaps suggesting that the operator intends to turn on the mobile base station with the key in the accessory position. The mobile base station may thus permit itself to be turned on. This prevents the mobile base station turning itself on in the split second between when a vehicle operator turns a key through the accessory position in one motion to the ignition position, and then having to deal with a drop in voltage from 12 V to 8 V as a result of the starter motor being engaged.

If the ignition is engaged, the mobile base station may identify that it is in a cranking state 403, which may result either in the ignition being turned off, with a return to state 401, or the ignition being turned on, with a transition to state 404. The mobile base station may turn on when state 404 is reached. Alternately, cranking state 403 may also exit to shore power state 406. Ignition on state 404 only has one outward transition, to off state 405, leading to a graceful shutdown of the base station while the ignition goes off. Battery power or capacitor backup power sufficient to perform an orderly shutdown may be made available, in some embodiments.

If shore power is active and state 406 is entered, the mobile base station will be turned on regardless of the state of the vehicle ignition.

Figure 5:
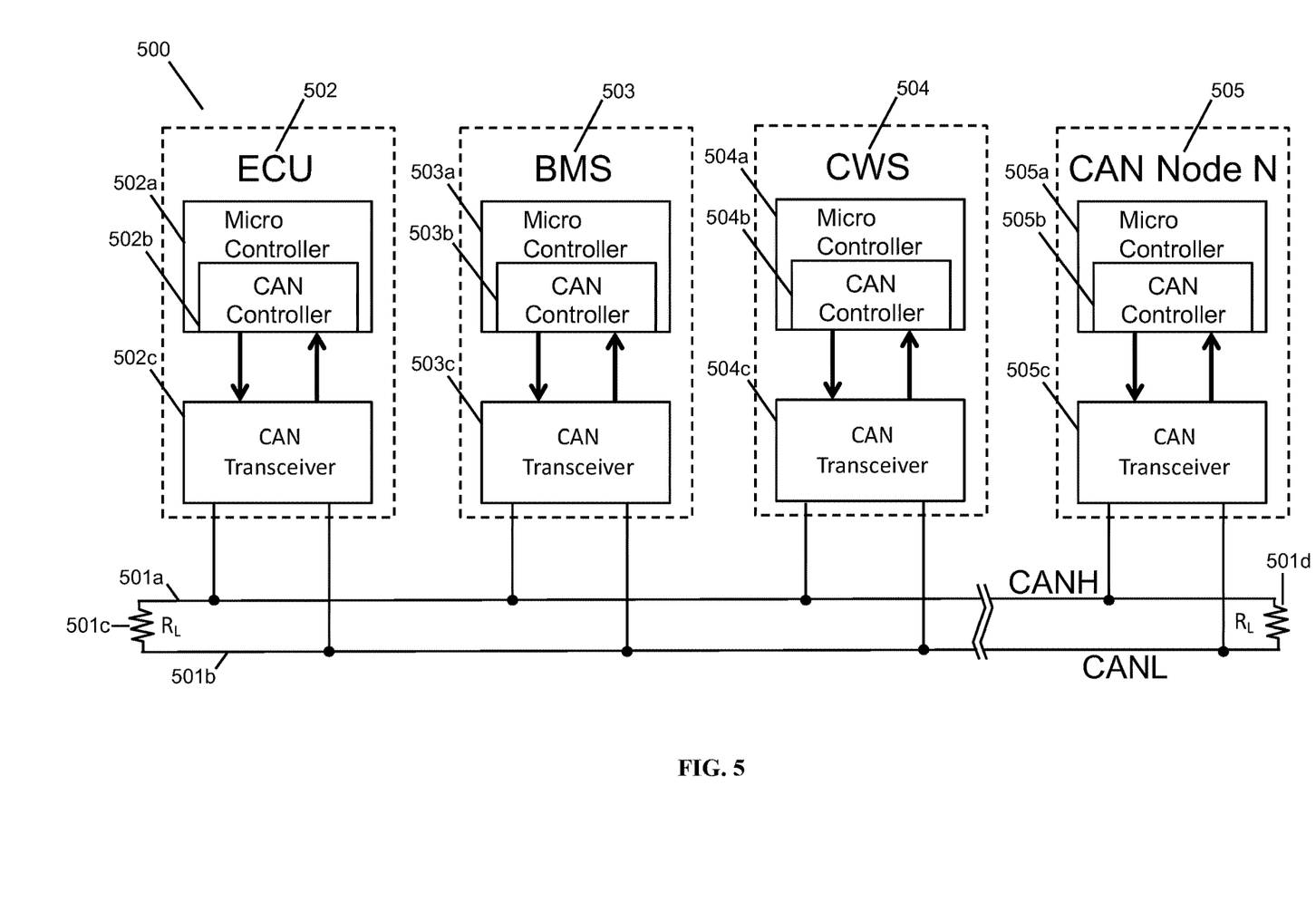
FIG. 5 is a circuit diagram of a controller area network (CAN) bus in a vehicle, in accordance with some embodiments.

FIG. 5 is a circuit diagram of a controller area network (CAN) bus in a vehicle, in accordance with some embodiments. CAN bus 500 is shown with CANH high voltage line 501a and CANL low voltage line 501b. The voltage difference between CANH 501a and CANL 501b is maintained by terminating resistors 501c and 501d, one at each end of the CAN bus, each with resistance RL. Devices connected to the CAN bus connect to CANH 501a and CANL 501b and measure the difference to send and receive messages on the bus. Electronic control unit (ECU) 502, battery management system (BMS) 503, Parallel Wireless Converged Wireless System (CWS) 504, and arbitrary CAN node N 505 are connected to the CAN bus.

ECU 502 is one of the primary controllers in the vehicle, and sends and receives control messages to other nodes on the CAN bus, such as open door messages, key in ignition messages, and so on. ECU 502 has microcontroller 502a, which includes CAN control circuit 502b; CAN control circuit 502b is connected to CAN transceiver 502c, which has two electrical connections to CANH 501a and CANL 501b. ECU 502 sends messages to CWS 504 that are used in power control of CWS 504, and CWS 504 may send requests to ECU 502 to request ignition to be started, etc.

BMS 503 is the controller that monitors battery state, and provides useful information to CWS 504, such as: battery low; battery high; battery fault. BMS 503 has microcontroller 503a, which includes CAN control circuit 503b; CAN control circuit 503b is connected to CAN transceiver 503c, which has two electrical connections to CANH 501a and CANL 501b.

CWS 504 is the mobile base station described elsewhere herein, and may send and receive messages to and from the other modules on the CAN bus. ECU 504 has microcontroller 504a, which includes CAN control circuit 504b; CAN control circuit 504b is connected to CAN transceiver 504c, which has two electrical connections to CANH 501a and CANL 501b.

Other nodes, such as CAN node N 505, may be on the CAN bus. For example, a dash button for controlling CWS 504 may have its own node on the CAN bus. Each node typically has certain components that have the same internal structure. Node 505 has microcontroller 505a, which includes CAN control circuit 505b; CAN control circuit 505b is connected to CAN transceiver 505c, which has two electrical connections to CANH 501a and CANL 501b.

Figure 6:
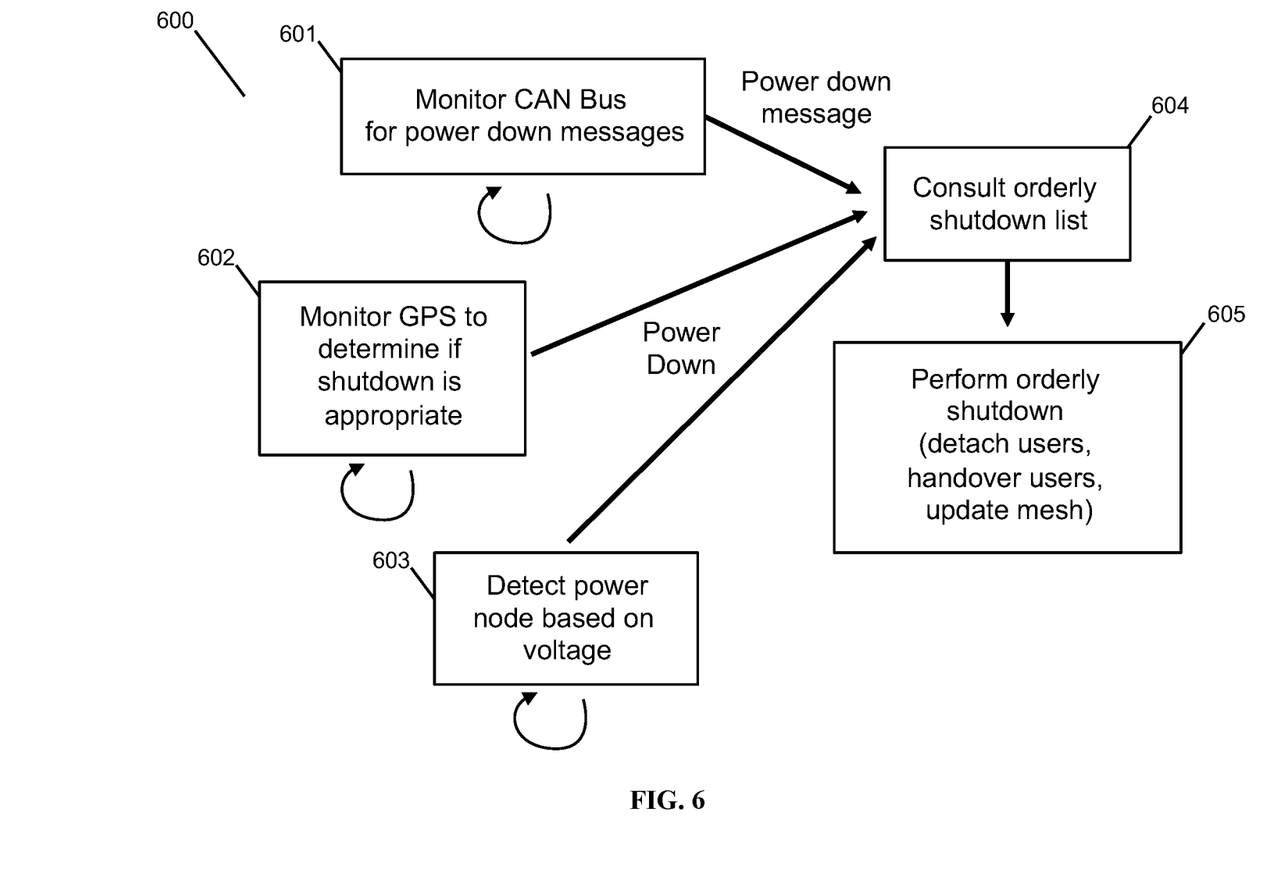
FIG. 6 is a flowchart of a method for handling changes to a vehicle power state, in accordance with some embodiments.

FIG. 6 is a flowchart 600 of a method for handling changes to a vehicle power state, in accordance with some embodiments. At step 601, the base station may monitor the CAN bus for power down messages, runlock messages, battery voltage low messages, or other messages. If a message is received, it may pass to step 604. Concurrently, at step 602, the base station may monitor GPS location to determine if shutdown is appropriate. If the location changes and the base station has entered into a location where it should shut down, control passes to step 604. Concurrently, a voltage sensor at step 603 may monitor the incoming electrical voltage of the system. If the vehicle shows a low voltage, control may go to step 604. Each of steps 601, 602, and 603 may execute as interrupt-driven loops that wake up from time to time and check whether an appropriate message has been received, so that the system is made aware as soon as an appropriate message is received.

At step 604, a determination may be made at the mobile base station that it is appropriate to shut the base station down, based on criteria from steps 601, 602, or 603. An orderly shutdown list is configured in the base station. For example, the base station may be configured to shut down unused access radios first, then in-use access radios, then backhaul radios. A final determination of what services and functions should be shut down is performed at this step, and control passes to step 605. Different inputs to step 604 may also be contemplated, as described elsewhere herein.

At step 605, depending on the services selected to be shut down, an orderly shutdown occurs of each service or functionality. For example, connected users may be detached or handed over. Mesh nodes relying on this base station for backhaul or access may be directed to another mesh node. A cloud coordination server may be informed that this node is going offline. This completes the orderly shutdown process.

Figure 7:
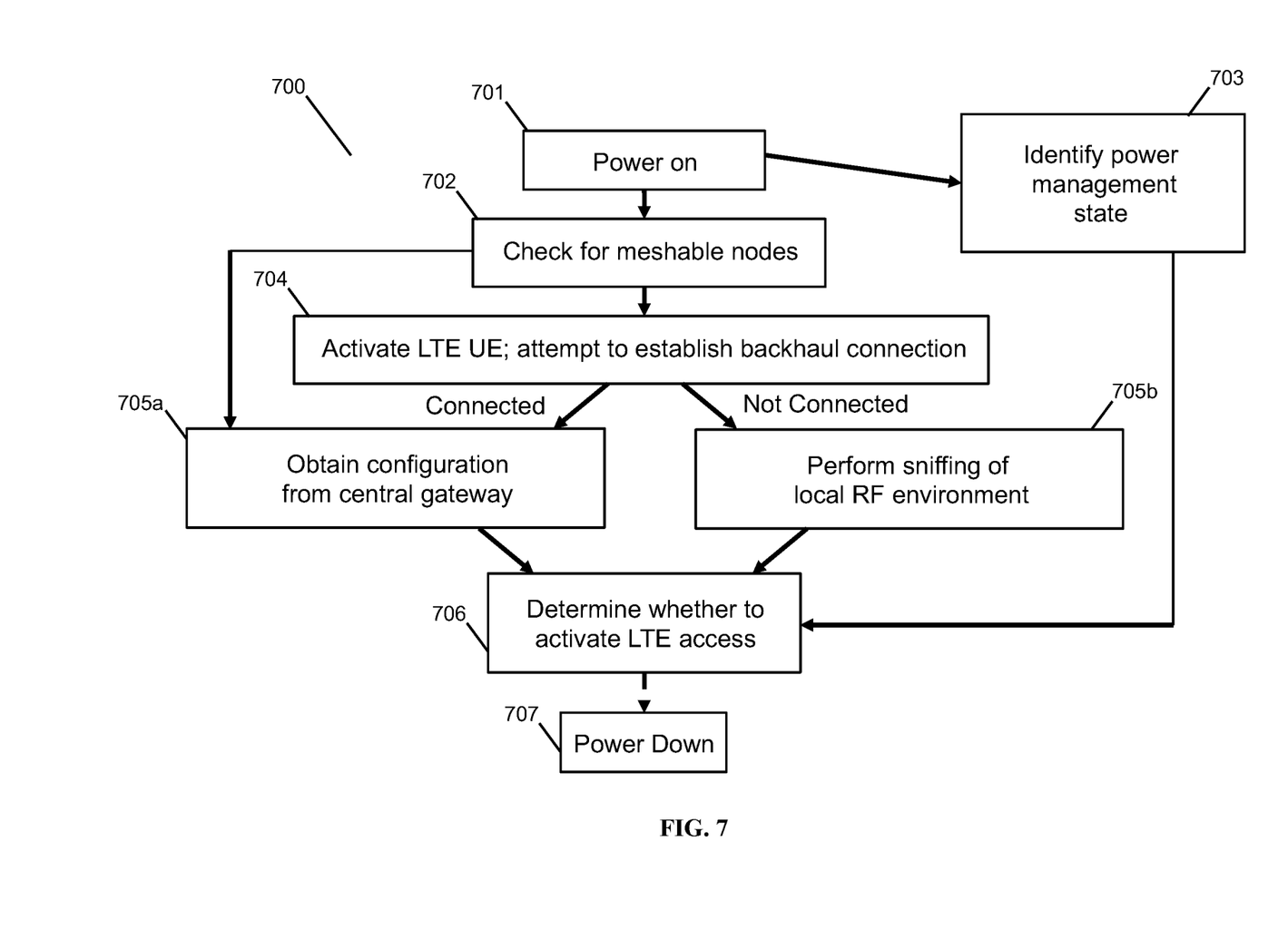
FIG. 7 is a flowchart of a method for activating a vehicle-mounted base station, in accordance with some embodiments.

FIG. 7 is a flowchart 700 of a method for activating a vehicle-mounted base station, in accordance with some embodiments. At step 701, the base station is powered on. At step 702, the base station immediately may activate its mesh radio and check for meshable nodes. The base station may also, at step 703, identify the power management state of the system. In the case that a meshable node is discovered at step 702, the base station now has a backhaul connection via the mesh to a configuration server, or is able to receive a configuration from its mesh peer. The base station may proceed to step 705a.

If there are no mesh nodes available, the base station may proceed to step 704, where the base station may activate its built-in LTE user equipment (UE) modem. The UE may be used to attempt to connect to an LTE macro cell for backhaul. If an LTE macro cell is available, control passes to step 705a.

At step 705a, the base station now has an active, valid backhaul connection. The base station uses the backhaul connection to obtain a configuration from a configuration gateway server, or failing this, obtains a configuration from a mesh peer, or failing this, obtains a configuration from its own cache. Control passes to step 706.

If, by contrast, if no backhaul LTE macro cell is available, the base station may use its LTE UE modem to perform radio sniffing of its local environment. By doing so it may determine, for example, that no LTE access is available, or that many LTE cells from another operator are crowding the local spectrum area, or another situation. Based on its identification of neighboring cells, including mesh or macro cells, the mobile base station may configure itself with power levels appropriate for potentially activating LTE access. Control passes to step 706.

At step 706, the base station determines whether or not to activate LTE access for UEs, based on its configuration, its local RF environment, its power management state, or some combination thereof. If conditions change, such as the ignition key changing the power management state, at step 707 the mobile base station gracefully powers down.

Figure 8:
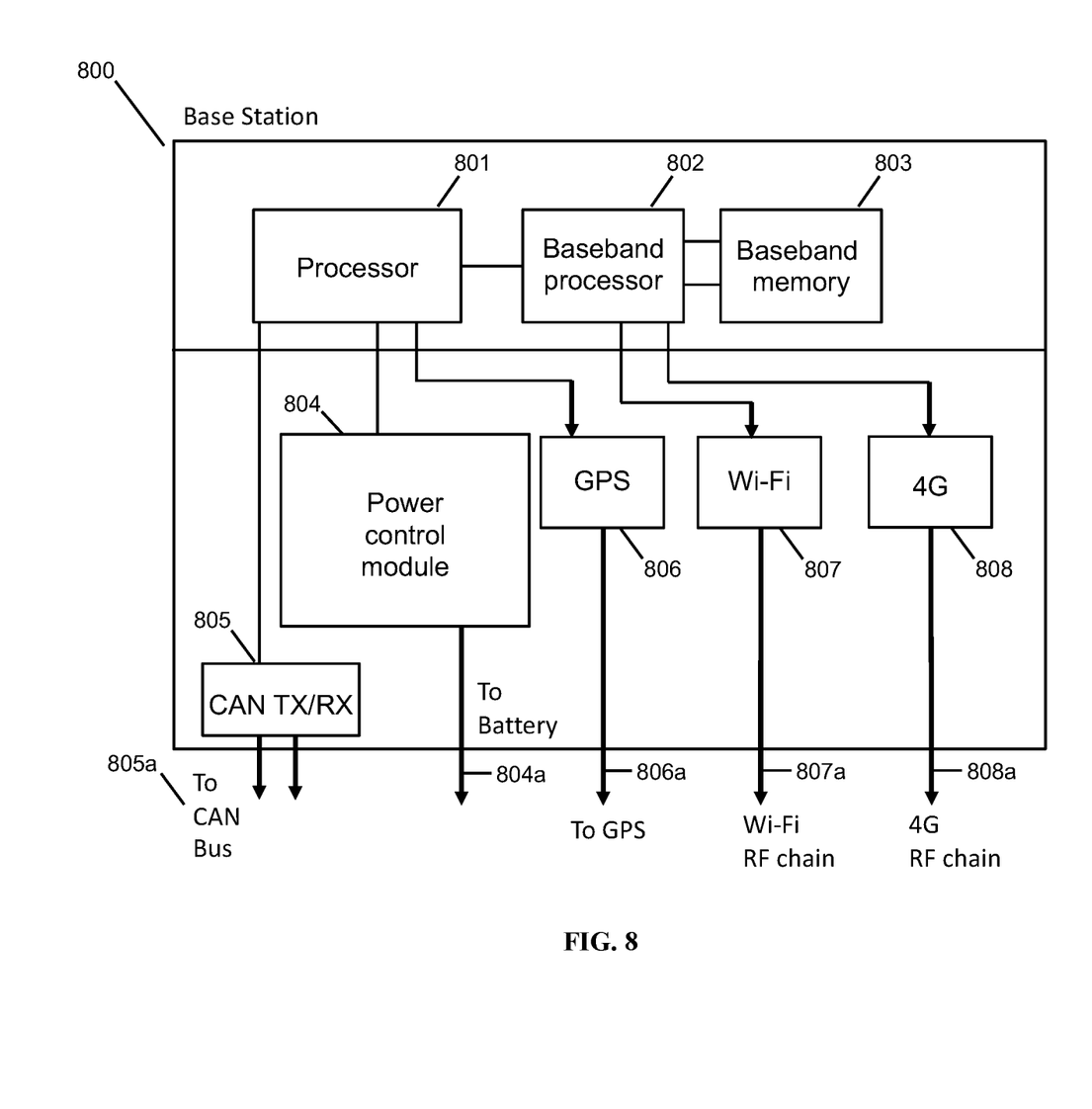
FIG. 8 is a block diagram of a vehicle-mounted base station (or in-vehicle base station), in accordance with some embodiments.

FIG. 8 is a block diagram of a vehicle-mounted base station (or in-vehicle base station), in accordance with some embodiments. Mobile base station 800 includes processor 801 and broadband processor (BBP) 802, which may share memory 803 or may use separate memory. Processor 801 is coupled to CAN bus module 805 and power control module 804. Processor 801 is also coupled to GPS 806. BBP 802 is coupled to first radio module 807, which here is a Wi-Fi module, and second radio module 808, which here as shown is a 4G/LTE module. Different radio modules, including different radio access technologies, different frequency bands, different modulation schemes, and different numbers of radio modules, may be present in some embodiments. These modules may be swappable to be compatible with different geographies' requirements as needed.

Power control module 804 performs power control evaluation functions as described elsewhere herein. Power control module 804 may be a software module, a hardware module, or a combination thereof. Power control module may execute on processor 801, in some embodiments. Power control module 804 may receive information from other modules, for example CAN bus module 805, and may use this information to make power control decisions. Power control module 804 may use interface 804*a* to communicate with the battery, or to, e.g., a switch on the dashboard or a direct voltage sampling connection to the electrical system of the vehicle.

CAN bus module 805, which may be connected via a USB interface, allows processor 801 to receive CAN bus messages from the CAN bus it is connected to via connectors 805*a*. Processor 801 then decides whether the messages are relevant for power control or for another purpose. If relevant for power control, the messages are fed back to power control module 804.

GPS module 806 may connect to GPS antenna 806*a*, which may be located on the exterior of the roof of the vehicle. GPS module 806 may then identify the location of the vehicle and may then pass this on to processor 801, which may use the location for various purposes.

Wi-Fi module 807 may connect to Wi-Fi RF chain 807*a*, which may include antennas, amplifiers and filters. Wi-Fi module 807 may be used for meshing, for access within the vehicle by wireless devices, for access outside of the vehicle by mobile devices, or for connecting devices within the vehicle's own network, such as connecting a button on the dash to the power control module. LTE module 808 may also include an RF chain 808*a*, including antennas, amplifiers, and filters.

FURTHER EMBODIMENTS

In some embodiments, a mobile device, such as a tablet, a laptop, or a smartphone, may be equipped with a software application for controlling the vehicle-mounted base station. The vehicle-mounted base station may allow the application to connect over IP to configure various parameters, such as: specification of which vehicle events may be used; specific timer values; geofencing locations, as further described below; or other parameters. The vehicle-mounted base station may allow only certain mobile devices to connect, for example by using password-based, SIM-based, IMSI-based, or local connection-based security.

In some embodiments, the vehicle-mounted base station may, upon connecting to the network, permit a properly-authenticated remote device, such as a cloud coordination server, to control the parameters described herein, such as: specification of which vehicle events may be used; specific timer values; geofencing locations, as further described below; or other parameters. As the vehicle-mounted base station is presumably in communication with access controllers and/or a mobile core network, the vehicle-mounted base station may provide access to and remote management of its parameters. The vehicle-mounted base station may upload and/or download its configuration to/from the cloud coordination server.

In some embodiments, the vehicle-mounted base station may provide an override instruction to remain on until the battery is exhausted, or until another specific condition occurs.

In some embodiments, the vehicle-mounted base station may include a secondary radio receiver providing limited functionality, and optionally its own battery, so that it may provide wake-on-LAN functionality. For example, the vehicle-mounted base station may listen for connections and may permit a mobile device to activate the base station, even if the vehicle itself is powered off. This may be useful when a police officer is outside the vehicle and determines that it is desirable to activate the vehicle-mounted base station.

In some embodiments, the power on/off behavior of the vehicle-mounted base station may be adjusted based on the power level of the vehicle battery. It is known that the CAN bus sends out power levels over the bus. Based on different power levels, the vehicle-mounted base station may extend its timer, or may use no timer, or may use different vehicle events to set/reset its timer.

In some embodiments, self-organizing network (SON) capabilities of vehicle-mounted base stations may be enhanced. For example, for two squad cars, if the first car's battery drops below a battery threshold, the second car's battery may have a higher charge level. The vehicle-mounted base stations in each of the two squad cars may continuously monitor both vehicles' battery levels and may coordinate power-off of the first car's base station and power-on of the second car's base station. In some embodiments, coordination may occur at or via a cloud coordination server. In some embodiments, when handoffs are expected, as in this case, the first car's base station may hand off its connections to the second base station.

Further embodiments may be contemplated as well. For example, if multiple squad cars arrive at a scene, all but one of the cars' vehicle-mounted base stations may turn themselves off. As another example, if multiple squad cars are present at a scene, with one of the cars providing base station capability for the other cars, the vehicle-mounted base stations in each of the cars may coordinate so that if one vehicle or multiple vehicles move away from the scene, base station capability is still provided by one of the remaining vehicles. Handoffs may also be supported. As another example, multiple squad cars may be supported by Wi-Fi link, with only one vehicle-mounted base station powered on.

In some embodiments, vehicle events, and other events, may be monitored for more than one vehicle. This can be useful when, for example, a first squad car may be providing base station capability for several other squad cars in the area, or for officers who have exited the squad car. In such a situation, all other base stations connected to the first squad car's vehicle-mounted base station, and all mobile devices connected to the first squad car's vehicle-mounted base station, may be instructed to forward vehicle events or other events to the vehicle-mounted base station so that, for example, if a second squad car pulls up and connects to the first squad car's vehicle-mounted base station, an active state of the second squad car's lights may be used to reset the timer. As another example, if a police officer is downloading data, even though the car has been powered off, the police officer's mobile device remains active, and the active state may be used to cause the vehicle-mounted base station to remain on.

Increasing and decreasing power levels may also be supported. For example, if two vehicles are driving toward each other, the vehicle-mounted base stations may determine that interference is increasing and reduce power.

In some embodiments, geofencing may be supported. Either a connected mobile device with GPS capability, or a GPS-enabled vehicle-mounted base station, or other GPS or location-sending functionality may be used to enable geofencing. In some embodiments, a vehicle-mounted base station in a police squad car may sense that it is at the police station, where the base station is not needed to be turned on, and may turn itself off. The base station may turn itself on when leaving the station. The base station may reduce the timer interval rather than turning off, in some embodiments. In another embodiment, a vehicle-mounted base station may be made aware that it is en route to a particular geographic location, for example by a 911 dispatcher with location information. The vehicle-mounted base station may turn itself on as soon as it comes within a configurable threshold distance of the destination.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A base station for providing dynamic power management, comprising:
   a processor within an enclosure mounted in a vehicle;
   a power management unit coupled to the processor;
   a voltage measurement module coupled to the power management unit and to a battery of the vehicle;
   a baseband processor coupled to the processor;
   a first wireless access functionality coupled to the baseband processor and providing access for user devices via a gateway to another network;
   a global positioning system (GPS) module and a geofencing module coupled to the GPS module and the processor, the geofencing module being coupled to the power management module, the geofencing module for determining whether a given radio access technology is activated or deactivated based on a location received from the GPS module, the GPS module being coupled to a GPS antenna mounted exterior to the vehicle; and
   wherein the power management unit is coupled to the first wireless access functionality, is configured to monitor the battery, is configured to determine a power state of the vehicle, and is configured to enable the processor to coordinate access radio shutdown or graceful user detach for the first wireless access functionality based on the determined power state of the vehicle, wherein the base station provides functionality so that an emergency responder has cellular coverage, including in areas where ordinary cell service is not available, or where coverage is weak, and wherein the base station is an in-vehicle base station and operates in conjunction with other base stations in a mesh configuration.

2. The base station of claim 1, wherein the vehicle power state comprises a voltage level of the battery of the vehicle.

3. The base station of claim 1, wherein the vehicle power state comprises a length of time after an ignition of the vehicle is turned off.

4. The base station of claim 1 wherein the voltage measurement module is coupled to both of an always-on power circuit of the vehicle and an ignition power circuit of the vehicle simultaneously.

5. The base station of claim 4, the power management unit further comprising instructions that, when executed on the processor, cause the power management unit to be in one of: a first state reflecting an accessory electrical mode of the vehicle, or an ignition on state reflecting an ignition on electrical mode of the vehicle.

6. The base station of claim 1, wherein the base station utilizes direct current (DC) power.

7. The base station of claim 1, wherein the base station alternating current (AC) power, and further comprises an inverter coupled to the battery of the vehicle, the inverter configured to return to a powered-on state after a transient fault without manual intervention.

8. The base station of claim 1, the power management unit further comprising a detector for determining whether shore power is being provided and for instructing the power.

9. The base station of claim 1, further comprising a controller area network (CAN) bus, and wherein a CAN bus monitoring system is coupled to the base station via a Universal Serial Bus (USB) port and to the CAN bus of the vehicle via an on-board diagnostic (ODB) port of the vehicle.

10. The base station of claim 1 wherein multiple mesh nodes that are close together hand off base station responsibilities to other nodes as necessary when their battery is depleted.

11. A method for dynamic power management of an in-vehicle base station comprising:
monitoring, at an in-vehicle base station, a vehicle controller area network (CAN) bus of a vehicle for power-related messages via a connection to the CAN bus;
monitoring, at the in-vehicle base station, a battery and a power management state of the vehicle;
determining by a global positioning system (GPS) module coupled to a geofencing module, whether a given radio access technology is activated or deactivated based on a location received from the GPS module, the GPS module being coupled to a GPS antenna mounted exterior to the vehicle; and
conducting, at the in-vehicle base station, an orderly shutdown of radio frequency services for mobile devices attached to a radio access network via the in-vehicle base station based on the power-related messages or the power management state of the vehicle, wherein the in-vehicle base station provides functionality so that an emergency responder has cellular coverage, including in areas where ordinary cell service is not available, or where coverage is weak, and wherein the in-vehicle base station operates in conjunction with other base stations in a mesh configuration.

12. The method of claim 11, further comprising monitoring, at the in-vehicle base station, the battery and the power management state of the vehicle via an electrical connection to the electrical circuit in the vehicle.

13. The method of claim 11, wherein monitoring the power management state of the vehicle comprises monitoring a voltage level of the battery of the vehicle.

14. The method of claim 11, wherein monitoring the power management state of the vehicle comprises monitoring a length of time after an ignition of the vehicle has been turned off.

15. The method of claim 11 wherein conducting the orderly shutdown further comprises detaching users, handing users over to another base station, or updating a routing configuration of a mesh network.

16. The method of claim 11, further comprising determining by a detector, whether shore power is being provided and for instructing the power.

17. The method of claim 11 further comprising multiple mesh nodes that are close together handing off base station responsibilities to other nodes as necessary when their battery is depleted.

* * * * *